United States Patent [19]

Sandberg

[11] Patent Number: 5,023,706
[45] Date of Patent: Jun. 11, 1991

[54] TELEVISION, RADIO AND BINOCULAR SYSTEM

[75] Inventor: Thomas M. Sandberg, Minneapolis, Minn.

[73] Assignee: The Kenyon Consortium, Minneapolis, Minn.

[21] Appl. No.: 486,552

[22] Filed: Feb. 27, 1990

[51] Int. Cl.$^5$ ............................................. H04N 5/64
[52] U.S. Cl. .................................... 358/254; 350/487; 206/316.3
[58] Field of Search ...................... 358/254, 248, 249; 350/547, 587, 143; 206/316.3

[56] References Cited

U.S. PATENT DOCUMENTS 1,018,771  2/1912  Neuburger ..................... 306/316.3
4,646,157  2/1987  Wakai et al. ...................... 358/259

FOREIGN PATENT DOCUMENTS 2446614  8/1980  France .............................. 206/316.3

Primary Examiner—Edward L. Coles, Sr.
Attorney, Agent, or Firm—Merchant, Gould, Smith, Edell, Welter & Schmidt

[57] ABSTRACT

A portable recreation unit 10 includes a protective housing 11 containing a battery powered television and battery powered radio 30 and binoculars 20. A support strap 53 is attached to the housing 11 for allowing the unit 10 to be supported, hands free, by the user. The housing 11 has at least one open position and at least one closed position, whereby the television, radio or binoculars can be used in the open position and where the television, radio or binoculars can be restrained or concealed in the closed position.

11 Claims, 4 Drawing Sheets

TELEVISION, RADIO AND BINOCULAR SYSTEM

BACKGROUND OF THE INVENTION

1. Field of the Invention

This invention relates generally to a combination of equipment packaged for convenient use during sporting events, and more particularly to a combination of a television, radio and binocular system which forms a portable recreation unit suitable for hands free support by the user.

2. Description of the Prior Art

For years, sports enthusiasts have taken binoculars and radios to sporting events to enhance their enjoyment of the event being watched. With the advent of battery powered portable televisions, the fan now has the option of also bringing a television to the event. While the size and bulk of battery powered televisions has been decreasing with the coming of new technology, the televisions have typically been hand-held. This can be quite cumbersome when the fan wishes to use his hands for other purposes.

In addition, the fan already has a pair of binoculars strapped around his neck to further clutter the space immediately around his hands. This is cumbersome and inconvenient for the fan to utilize both the television and the binoculars either simultaneously or independently. If he uses the television, he must then store the binoculars, or if he is using the binoculars, he must then some how place the television on the floor or surrounding area. Still further, the battery powered television also typically has an am/fm radio. However, it is necessary for the fan to decide whether or not he wishes to listen to the radio or watch the television. Quite often, the fan wishes to watch the game in progress, but listen to the commentary on the radio. This requires the fan to bring a radio as well as television.

The present invention address the shortcomings of the prior art devices and provides for a portable recreation unit suitable for hands free support of a combination of the radio, television and binoculars.

SUMMARY OF THE INVENTION

The present invention is a portable recreation unit suitable for hands free support by a user. The unit includes in combination a protective housing containing a battery powered television, a battery powered radio, and binoculars. At least one support strap is attached to the housing for allowing the unit to be supported, hands free, by a user when the support strap is placed on the user. The protective housing has at least one open position and at least one closed position, whereby the television, radio or binoculars can be used in the open position and where the television, radio or binoculars can be restrained or concealed in the closed position. In a preferred embodiment, the housing includes a first section having top and bottom ends. The first section, when the unit is placed on the user, the first section abuts the user. A second section having top and bottom ends is pivotally connected to the bottom end of the first section, wherein when placed on the user, the top end of the second section moves away from the user when moved between the closed position to the open position. Still further, it is preferred that the support strap be design to be placed around the neck of the user and further that it be releasably attached to the housing section.

DETAILED DESCRIPTION OF THE PREFERRED EMBODIMENT

Figure 7:
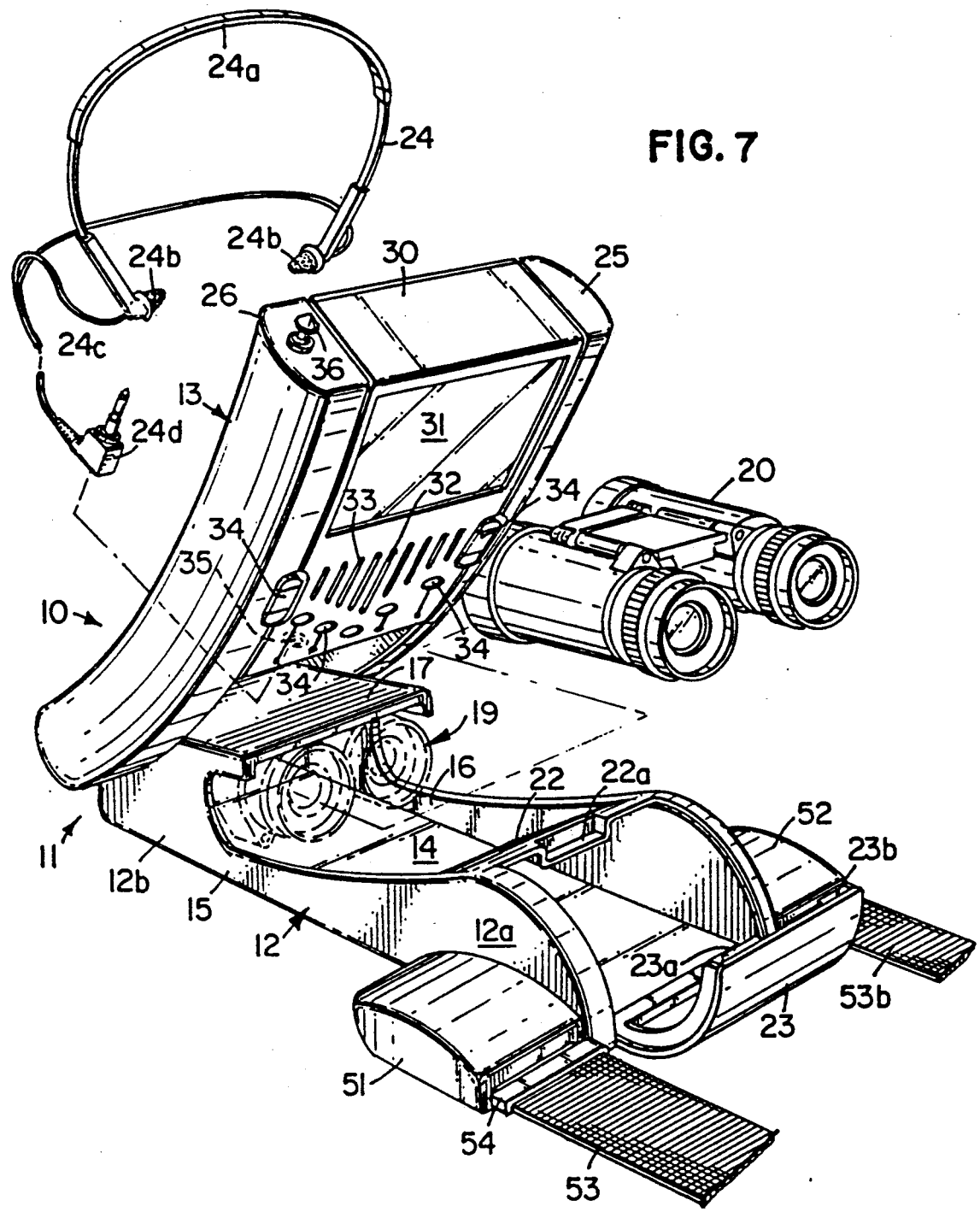
FIG. 7 is a perspective view of the unit shown in FIG. 1 in an open position.

Referring to the drawings, wherein like numbers represent like parts throughout the several views, there is generally disclosed at 10 a portable recreation unit. The unit 10 includes a protective housing generally designated as 11. The housing 11 includes a first section 12 and a second section 13. The first section 12 has a top end 12a and a bottom end 12b. The first section 12 further has a back panel 14 and first side panel 15 and second side panel 16 operatively connected to the back panel 14. A lower front panel 17 is operatively connected between the bottom of the first and second side panels 15 and 16 and a rounded bottom panel 18 is connected between the lower front panel 17 and back panel 16. A cavity 19 is formed between the panels 14–18 and is utilized for storing a pair of foldable binoculars 20. As shown in FIG. 7, the binoculars 20 are shown in an opened position outside of the unit 10 and in a closed position, in phantom, inside of the cavity 19. The binoculars 20 may be any suitable high quality binoculars such as those available from L. L. Bean & Company. The side panels 15 and 16 each have a cutout which provides access to the side of the binoculars 20 to permit their easy removal. At the top end 12a of the first section 12, a storage compartment 21 is formed between the side panels 15 and 16 and back panel 14 by an upper front panel 22 and a cover 23. The upper front panel 22 extends generally from the top of the side panels 15 and 16 and goes downward to meet the back panel 14. The cover 23 is pivotally mounted between the side panels 15 and 16. Tabs 23a form a friction fit, when closed, underneath the upper panel 22 to retain the cover 23 when in a closed position. When it is desired to open the cover 23, the user may insert his finger into the cover indentation 22a and pull upward on the cover 23, causing the tabs 23a and b to disengage from the cover 22 and pivot to the open position as shown in FIG. 7. The earphones 24, may be of any suitable collapsible earphones known in the art. The earphones 24 are sized to be able to collapse to fit inside of the storage compartment 21. The earphones 24 includes a headband 24a, two speakers 24b, operatively connected, by means of wire 24c, to a jack 24d.

The second section 13 of the housing 11 comprises a first elongate member 25 and a second elongate member 26. The elongate members 25 and 26 are mirror images of each other. Each of the members 25 and 26 are pivotally mounted to the first section 12. A round stub axle 27 is operatively connected to the inside of the second elongate member 26 proximate the bottom end thereof.

The stub 27 is pivotally mounted into an opening in the bottom portion 12b of the first side panel 15. Further a peg 28 is operatively connected to the inside of the elongate member 26. A arcuate slot 29 is also formed in the first side panel 15. As the second elongate member 26 rotates around the stub axle 27, the peg moves 28 moves within the arcuate slot 29. The movement of the elongate member 26 is controlled by the length of the arcuate slot 29. The peg 28 will stop the movement of the elongate member 26 as it reaches the ends of the slot 29. Similarly, the first elongate member 25 is pivotally mounted to the second side panel 16. The housing 11 is preferably made from a high impact plastic.

The combination liquid crystal display (LCD), television and am/fm radio unit 30 is operatively supported between the members 25 and 26. When in the open position, as shown in FIG. 7, the screen 31 of the combination television and radio is readily visible. The speaker 32 emits sounds through slots 33 in the television and radio unit 30. The control buttons 34 control the various functions of the combination television/radio 30. An earphone jack connector 35 is positioned in the bottom of the television/radio unit 30. The jack 24d is inserted into the connector 35 to enable the user to hear the radio or television. An extendable rod antenna 36 is mounted in the second elongate member 26 and is operatively connected to the television/radio unit 30. The construction of the combination LCD television and am/fm radio unit 30 is obvious to one skilled in the art and the details of such construction are not set forth as any suitable television and radio combination may be utilized. The television and radio 30 has a thickness which is equal to the thickness of the members 25 and 26.

Figure 5:
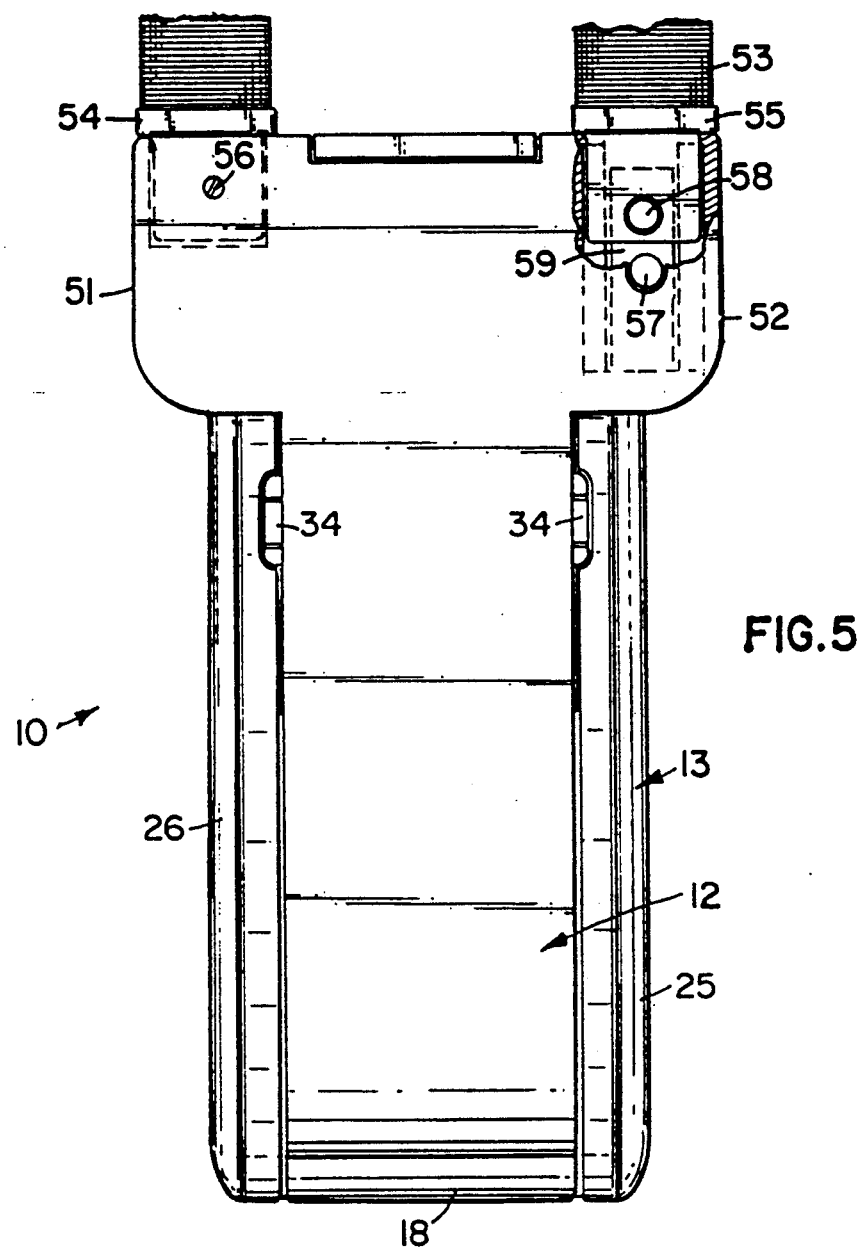
FIG. 5 is a rear elevation view of the unit shown in FIG. 1.
Figure 6:
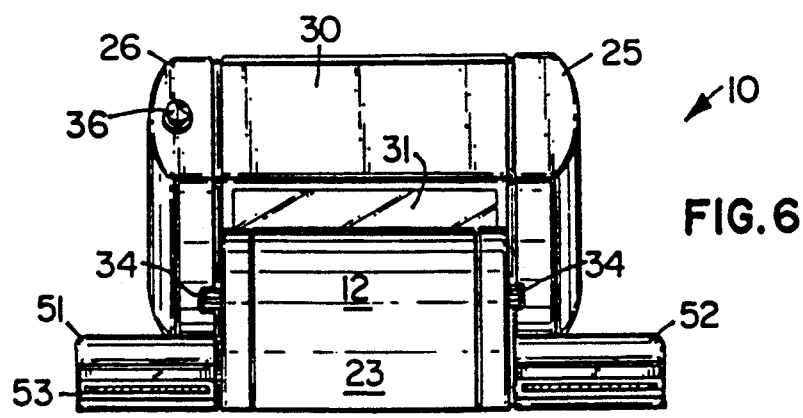
FIG. 6 is a top plan view of the unit shown in FIG. 1.

At the top end 12a of the first section 12, a first flange 51 is operatively connected to the first side panel 15 and a second flange 52 is operatively connected to the second panel 16. A strap 53 has a first end 53a having attached thereto a first clip 54 and a second end 53b having attached thereto a second clip 55. Each of the flanges 51 and 52 have a slot into which the clips 54 and 55 are respectively inserted. As shown in FIG. 5, clip 54 is inserted into the slot of the first flange 51 and secured in place by a screw 56. The second clip 55 is releasably connected into the slot in the second flange 52. A release button 57 is operatively connected to a release latch 58 by means of a spring arm 59. The release latch 58 engages an opening in the clip 55 to secure the clip 55 in place. When it is desired to release the clip 55, the button 57 is simply depressed, thereby causing the latch 58 to go down and release the clip 55.

Figure 1:
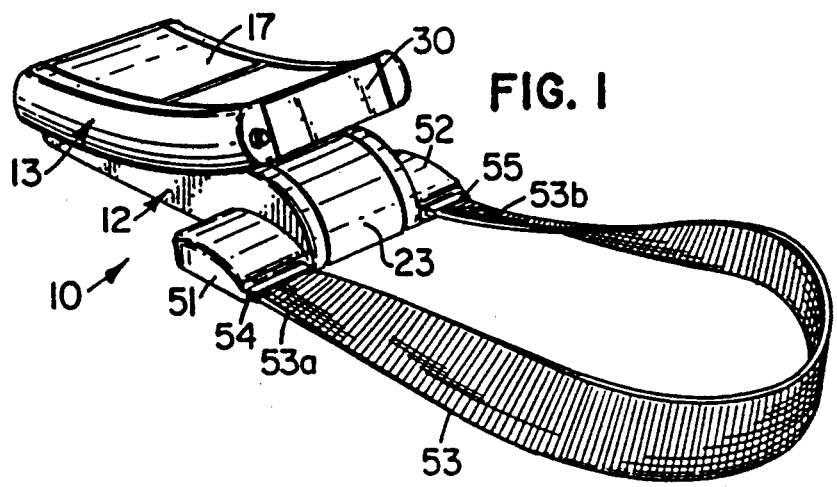
FIG. 1 is a perspective view of the recreation unit in a closed position embodying the present invention.
Figure 2:
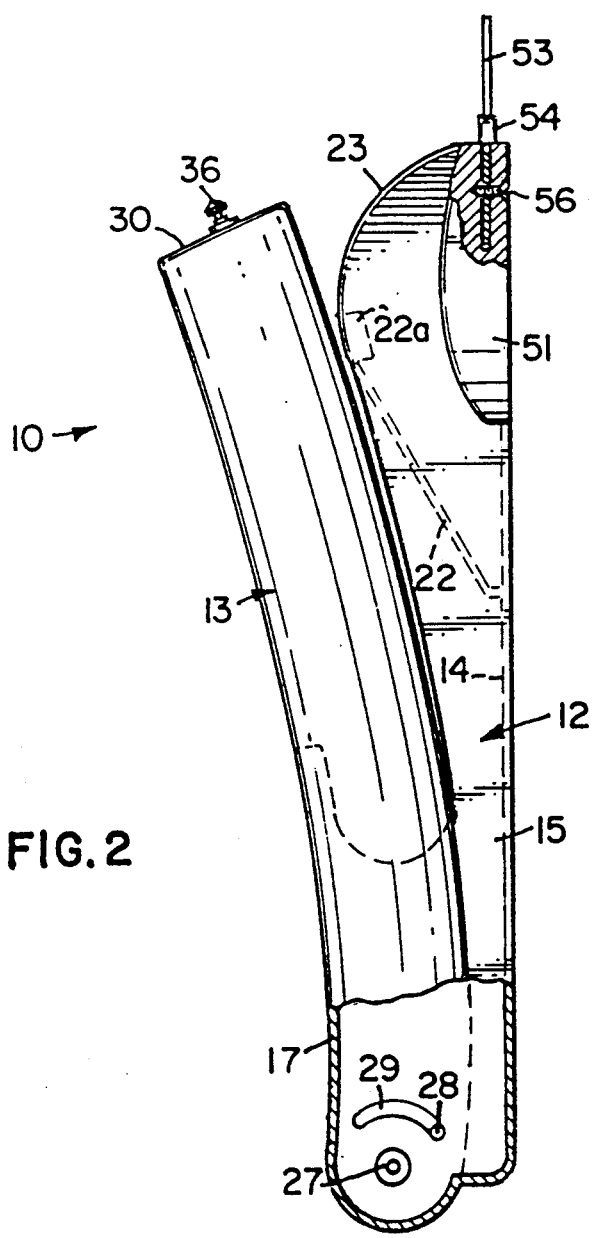
FIG. 2 is a left side elevation view of the unit shown in FIG. 1.
Figure 3:
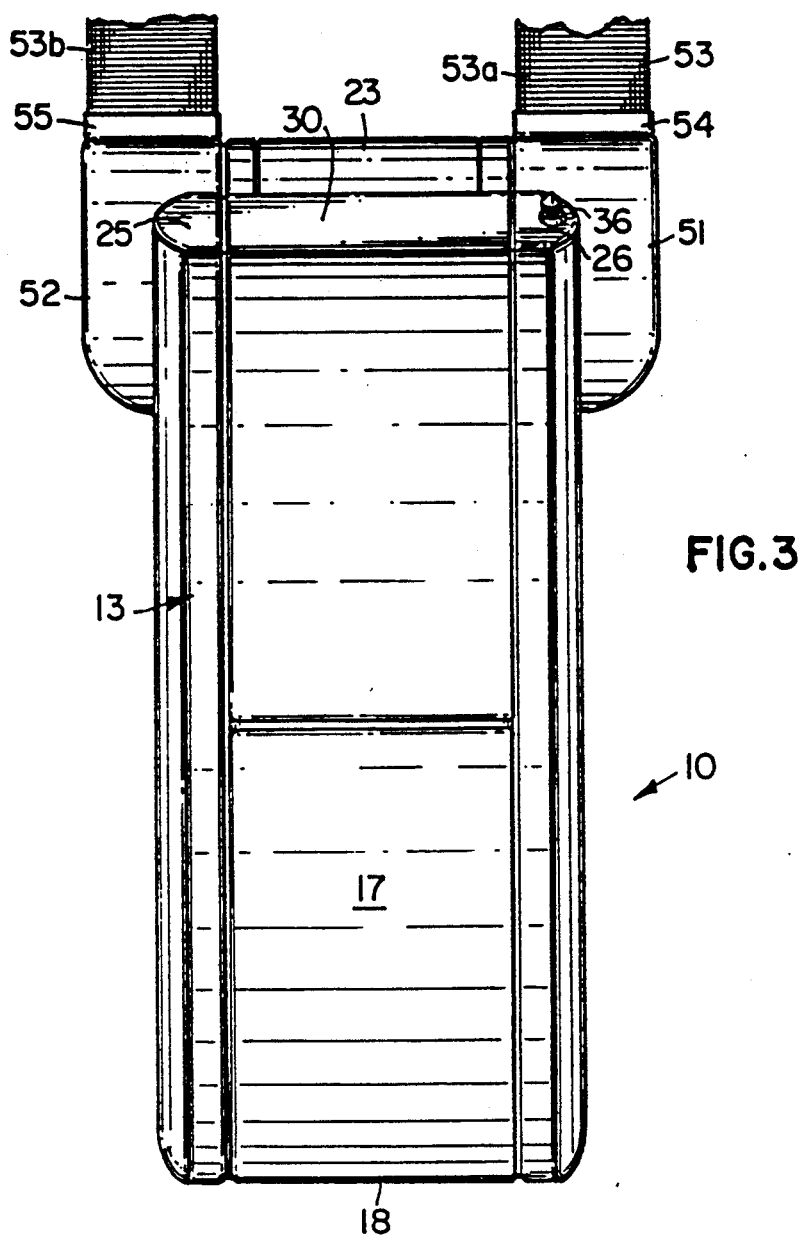
FIG. 3 is a front elevation view of the unit shown in FIG. 1.
Figure 4:
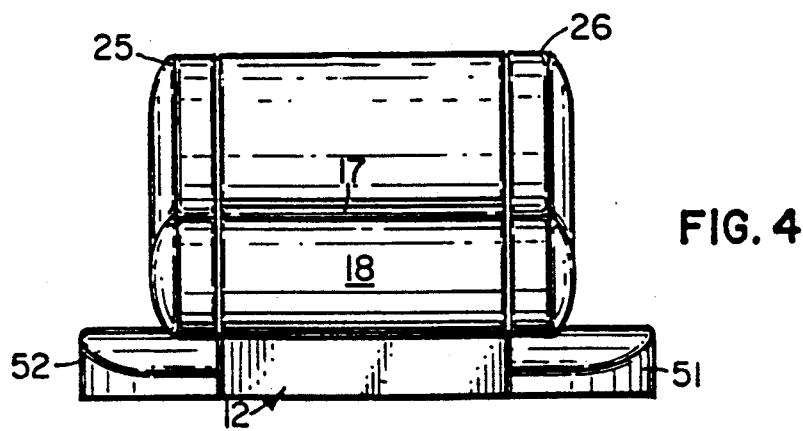
FIG. 4 is a bottom plan view of the unit shown in FIG. 1.

In operation, when the user wishes to transport the unit 10, the clip 55 is released from the second flange 52 and strap 53 is placed around the user's neck and the clip 55 then inserted into the second flange 52 and is secured in place by the latch 58. The strap 52 may be made adjustable in length and alternatively have both or neither of the ends releasably connected. Having positioned the strap 53 around his neck, the back panel 14 then rests against the chest of the user. When not utilizing the television or radio, the unit 10 is typically in the closed position as shown in FIG. 1 so as to provide a more compact unit. When the user wishes to utilize the television, radio or binoculars, the user simply grasps the top end of the second section 13 and pivotally rotates the top end away from the user's chest to the open position as shown in FIG. 7. When in the open position, the binoculars 20 may be removed and utilized by the user. If it is only the binoculars that are to be used, the user will typically move the unit 10 to the closed position. However, if the user wishes to listen to the radio or look at the television, the unit 10 is in the open position, as shown in FIG. 7. To listen to the radio or television, the earphones 24 are removed from the storage compartment 21 and the jack 24d is inserted into the earphone connector 35. Then, the user utilizes the control buttons 34 to turn on the television and also to select whether the sound would come from the television or the radio. The antenna 36 is extended upward to obtain the best reception. When in the open position, as shown in FIG. 7, the television screen 31 is extended out away from the viewer's chest and is in a good viewing position for the user. The user then has his hands free to do a variety of other tasks and does not have to hold the television/radio or binoculars. The binoculars can easily be removed, used and then stored depending upon utilization which the user wishes to make of the binoculars 20. While the drawings show the unit 10 in either an open position (FIG. 7) or a closed position (FIG. 2), it is understood that the unit is also capable of having many intermediate positions. In the pivoting of the second section 13, it is necessary to overcome some frictional force. If the user decides to place the section 13 in an intermediate position, the second section 13 will stay in that intermediate position due to friction.

The unit 10 provides for a convenient package to take along to a sporting event, a television, radio and binoculars without the necessity of having several separate packages. Still further, it provides for a means for hands free use and viewing of the television and/or radio while still being supported by the user.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

I claim:

1. A portable recreation unit suitable for hands free support by a user, said unit comprising in combination:
    (a) a protective housing constructed from high impact plastic containing a battery powered television, a battery powered radio and binoculars;
    (b) at least one support strap attached to said housing for allowing said unit to be supported, hands-free, by a user when the support strap is placed on the user; and
    (c) said protective housing having at least one open position and at least one closed position, whereby the television, radio or binoculars can be used in said open position and where said television, radio or binoculars can be restrained or concealed in said closed position.

2. The unit of claim 1, further comprising means for releasably connecting at least one end of said support strap to said housing.

3. The unit of claim 1, wherein said support strap is configured to be supported on the user's neck.

4. The unit of claim 1, further comprising a storage compartment for ear plugs, said compartment located on said first section.

5. The unit of claim 1, further comprising an extendable rod antenna positioned proximate said top end of said second section, said antenna operatively connected to said television and said radio.

6. The unit of claim 1, wherein said housing is constructed from a high impact plastic.

7. The unit of claim 1, wherein said housing comprises:

(a) a first section having top and bottom ends, said firs section, when said unit is placed on the user, said first section abuts the user; and (b) a second section having top and bottom ends, said bottom end of said second section pivotally connected to said bottom end of said first section, wherein, when placed on the user, said top end of said second section moves away from the user when moved between said closed to said open position.

8. The unit of claim 7, wherein said television is contained in said second section, wherein when said unit is supported around the user's neck and in an open position, said television can be viewed by the user.

9. The unit of claim 8, wherein said binoculars are contained in said first section.

10. The unit of claim 9, wherein said binoculars are foldable between an open, operative position and a closed, stored position.

11. A portable recreation unit suitable for hands free support by a user, said unit comprising in combination:

(a) a protective housing containing a battery powered television, a battery powered radio and binoculars, said housing comprising:

(i) a first section having top and bottom ends, said first section, when said unit is placed on the user, said first section abuts the user; and (ii) a second section having top and bottom ends, said bottom end of said second section pivotally connected to said bottom end of said first section, wherein, when placed on the user, said top end of said second section moves away from the user when moved between said closed to said open position;

(b) at least one support strap attached to said housing for allowing the unit to be supported, hands free, around a user's neck;

(c) said binoculars are contained in said first section and said binoculars are foldable between an open, operative position and a closed, stored position; and (d) said protective housing having at least one open position and at least one closed position, whereby the television, radio or binoculars can be used in said open position and where said television, radio or binoculars can be restrained or concealed in said closed position.

* * * * *